United States Patent
Giardini et al.

(10) Patent No.: US 11,472,993 B2
(45) Date of Patent: Oct. 18, 2022

(54) NON-AQUEOUS SUSPENSIONS

(71) Applicant: Lamberti SPA, Albizzate (IT)

(72) Inventors: Lorenzo Giardini, Casella (IT); Luigi Merli, Saronno (IT); Pierangelo Pirovano, Comerio (IT); Giovanni Floridi, Novara (IT); Giuseppe Li Bassi, Gavirate (IT)

(73) Assignee: Lamberti SPA, Albizzate (IT)

( * ) Notice: Subject to any disclaimer, the term of this patent is extended or adjusted under 35 U.S.C. 154(b) by 85 days.

(21) Appl. No.: 16/759,538

(22) PCT Filed: Oct. 23, 2018

(86) PCT No.: PCT/EP2018/079069
§ 371 (c)(1),
(2) Date: Apr. 27, 2020

(87) PCT Pub. No.: WO2019/081534
PCT Pub. Date: May 2, 2019

(65) Prior Publication Data
US 2020/0283670 A1   Sep. 10, 2020

(30) Foreign Application Priority Data
Oct. 27, 2017 (IT) .................. 102017000122785

(51) Int. Cl.
*C09K 8/035* (2006.01)

(52) U.S. Cl.
CPC .................... *C09K 8/035* (2013.01)

(58) Field of Classification Search
CPC .......... C09K 8/035; C09K 8/32; C09K 8/508; C09K 8/514; C09K 8/5751; C09K 8/5758; C09K 8/88; C09K 8/882
See application file for complete search history.

(56) References Cited

U.S. PATENT DOCUMENTS

| | | | | |
|---|---|---|---|---|
| 4,299,710 A | * | 11/1981 | Dupre | C09K 8/12 507/119 |
| 4,915,174 A | * | 4/1990 | Berrod | C09K 8/08 507/103 |
| 6,451,743 B1 | | 9/2002 | Fox | |
| 2003/0181532 A1 | * | 9/2003 | Parris | C09K 8/82 516/20 |
| 2003/0203821 A1 | | 10/2003 | Fox | |

FOREIGN PATENT DOCUMENTS

| | | |
|---|---|---|
| WO | 02089753 A1 | 11/2002 |
| WO | 03080995 A1 | 10/2003 |
| WO | 2009026349 A1 | 2/2009 |
| WO | 2009108271 A1 | 9/2009 |

OTHER PUBLICATIONS

Patent Cooperation Treaty Written Opinion of the International Searching Authority; PCT/EP2018/079069.
International Search Report for PCT/EP2018/079069 dated Jan. 18, 2019.

* cited by examiner

*Primary Examiner* — Aiqun Li
(74) *Attorney, Agent, or Firm* — Vorys, Sater, Seymour and Pease LLP; Iona Niven Kaiser

(57) ABSTRACT

Non-aqueous suspension composition of water-soluble polymers and method for treating a subterranean formation comprising the step of placing an aqueous fluid containing the suspension composition into the subterranean formation.

11 Claims, No Drawings

NON-AQUEOUS SUSPENSIONS

The present invention relates to novel non-aqueous suspension compositions of water-soluble polymers, which can be used as additives in water-based fluids, and methods of making of such non-aqueous suspension compositions.

BACKGROUND OF THE INVENTION

Thickened water-based fluids are widely used in the oil, gas and mining industry. Such fluids are typically thickened in order to increase viscosity or suspend particles, in many well treatments such as drilling, completion, fracturing, acidizing, cleanout, gravel packing and the like.

Water-based well treatment fluids usually contain a hydratable polymer that is suitable for thickening the fluid and may be further thickened by chemical crosslinking. Such a polymer typically is made available in either a powder form or a suspended form in a carrier fluid, which is a non-aqueous solvent. In general, the powder or suspension must provide polymers that hydrate rapidly.

Dry polymer particles must first be dispersed so that individual particles can absorb water; otherwise, some of the polymer will not hydrate, thus leading to the formation of lumps that contain dry powder inside a gelatinous coating. For this reason, suspensions and processes for their preparation are preferred and have been developed to overcome the problems associated with using dry polymer particles.

In this context, the selection of a suitable suspending agent is crucial.

For example, U.S. Pat. No. 6,451,743 describes a non-aqueous suspension comprising non-soluble particles dispersed in a non-aqueous liquid medium in the presence of a suspension aid, wherein said non-aqueous liquid medium is selected from the group consisting of glycols, polyglycols, glycol ethers, glycol esters, and glycol ether esters and wherein said suspension aid is selected from the group consisting of hydroxypropyl cellulose, ethyl cellulose, polyvinyl pyrrolidone, polyacrylic acid and copolymers of polyvinyl pyrrolidone and acrylic acid.

WO 03/080995 describes a suspension of a water-soluble material in a non-aqueous carrier fluid using a suspension agent that includes a thixotropic agent and, optionally, an organophilic clay, wherein said thixotropic agent is a polyamide or a hydroxypropyl cellulose.

WO 2009/026349 relates to a composition comprising a hydrocolloid gum, a cellulose thickener, and a solvent component comprising a lactate ester and, optionally, an alkylene glycol alkyl ether.

Notwithstanding the improvements described in these patents, there is still a need to provide non-aqueous suspensions compositions, which can be used as additive in water or water-based fluids, and which are stable even at high temperature for use in oil and gas field applications.

SUMMARY OF THE INVENTION

It is therefore an object of the present invention a non-aqueous suspension composition comprising:
a) from 20 to 80 wt % (% by weight) of a carrier fluid selected from the group consisting of glycols, polyglycols, glycol ethers, glycol esters, lactate esters or mixtures thereof;
b) from 5 to 60 wt % of a water-soluble polymer dispersed in said carrier fluid, wherein said water-soluble polymer is selected among polysaccharides or derivatives thereof;
c) from 0.5 to 15 wt % of a suspending agent, wherein said suspending agent is a copolymer of a monoethylenically unsaturated monomer containing a carboxylic group and a (meth)acrylic acid ester.

A further object of the invention is a method for treating a subterranean formation comprising the following steps:
i. providing an aqueous fluid containing a suspension composition comprising:
   a) from 20 to 80 wt % (% by weight) of a carrier fluid selected from the group consisting of glycols, polyglycols, glycol ethers, glycol esters, lactate esters or mixtures thereof;
   b) from 5 to 60 wt % of a water-soluble polymer dispersed in said carrier fluid, wherein said water-soluble polymer is selected among polysaccharides or derivatives thereof;
   c) from 0.5 to 15 wt % of a suspending agent, wherein said suspending agent is a copolymer of a monoethylenically unsaturated monomer containing a carboxylic group and a (meth)acrylic acid ester;
ii. placing the aqueous fluid into a subterranean formation.

According to another embodiment, the invention provides a method of preparing a suspension composition comprising the following steps:
a) providing a from 20 to 80 wt % of a carrier fluid selected from the group consisting of glycols, polyglycols, glycol ethers, glycol esters, lactate esters or mixtures thereof;
b) adding from 0.5 to 15 wt % of a suspending agent to said carrier fluid, wherein said suspending agent is a copolymer of a monoethylenically unsaturated monomer containing a carboxylic group and a (meth)acrylic acid ester;
c) providing from 5 to 60 wt % of a water-soluble polymer which is selected among polysaccharides or derivatives thereof;
d) adding and mixing said water-soluble polymer to said carrier fluid containing the dissolved copolymer, thus obtaining a stable non-aqueous suspension.

DETAILED DESCRIPTION OF THE INVENTION

Preferably, said non-aqueous suspension comprises:
a) from 30 to 60 wt % of a carrier fluid selected from the group consisting of glycols, polyglycols, glycol ethers, glycol esters, lactate esters or mixtures thereof;
b) from 30 to 50 wt % of a water-soluble polymer dispersed in said carrier fluid, wherein said water-soluble polymer is selected among polysaccharides or derivatives thereof;
c) from 1 to 10 wt % of a suspending agent, which is a copolymer of a monoethylenically unsaturated monomer containing a carboxylic group and a (meth)acrylic acid ester.

Although non-aqueous suspensions comprising various suspending agents have been described in the literature, it has surprisingly been found that also copolymers of a monoethylenically unsaturated monomer containing a carboxylic group and a (meth)acrylic acid ester can be successfully used to provide stable and easily pourable non-aqueous suspensions of a water-soluble polymer. This result is particularly surprising, because such copolymers, which are usually obtained through an emulsion polymerization process, have been developed and are extensively used as thickening agents and/or suspending agents in aqueous systems (e.g., in cosmetics or detergency), wherein their thickening effect is driven by the electrostatic repulsion between the carboxylate groups.

The suspension compositions according to the invention are non-aqueous. As referred to herein, "non-aqueous" means a liquid which is substantially free of water or which contains a minor amount of water. The minor amount of water in the suspension medium can be ascribed to different sources: the moisture content of the water-soluble polymer, residual content of water which can be present in the non-aqueous carrier fluid after a distillation process, water content of the copolymer, which can be provided in the form of an emulsion. Said minor amount of water is generally less than 10% by weight (wt %), preferably less than 5 wt % of the suspension. The carrier fluids of the invention are non-aqueous and are miscible with water. Suitable carrier fluids are selected from the group consisting of glycols, polyglycols, glycol ethers, glycol esters, lactate esters or mixtures thereof. Preferably, said non-aqueous carrier fluids are glycol ethers.

The glycols or polyglycols suitable for use as the carrier fluid of the invention should have a molecular weight greater than 100 Da; compounds having molecular weights below 100 Da tend to undesirably solvate the suspended particles. However, due to the requirement that the carrier fluid is in the liquid phase at ambient temperatures, their molecular weight should be less than 4,000 Da. Therefore, suitable glycols and polyglycols can have a molecular weight in the range of from 100 to 4,000 Da, preferably from 100 to 3,000 Da, and more preferably, from about 100 to 2,000 Da. Said molecular weights are calculated based on the hydroxyl number, which can be determined according standard methods ASTM E222-10 or E1899-16.

The glycols that can be used as carrier fluid have the following general formula:

$$H\text{—}O\text{—}R_1\text{—}O\text{—}H,$$

where $R_1$ is an alkylene group having from 4 to 8 carbon atoms. Examples of suitable glycols include butylene glycol, 1,5-pentanediol and hexylene glycol.

The polyglycols that can be used as the carrier fluid have the following formula:

$$H\text{—}[O\text{—}R_1]_n\text{—}O\text{—}H,$$

where $R_1$ is an alkylene group having from 1 to 6 carbon atoms, preferably, from 2 to 4 carbon atoms. The value for n is an integer in the range of from 1 to 10. Specific examples of polyglycols that can suitably be used include, but are not limited to, diethylene glycol, triethylene glycol, dipropylene glycol, tripropylene glycol, polyethylene glycol (having a molecular weight between 200 to 4,000 Da, preferably from 200 to 1,000 Da), and polypropylene glycol (having a molecular weight between 200 to 4,000 Da, preferably from 200 to 1,000 Da). The preferred polyglycols for use as the carrier fluid are diethylene glycol and triethylene glycol.

The glycol ethers that can be used as the carrier fluid have the following general formula:

$$R_2\text{—}[O\text{—}R_1]_n\text{—}O\text{—}R_3,$$

where $R_1$ is an alkylene group having from 1 to 6 carbon atoms, preferably, from 2 to 4 carbon atoms, and where each $R_2$ and $R_3$ can be a hydrogen, an alkyl, aryl, aralkyl or alkylaryl group having from 1 to 10 carbon atoms, provided that they are not both a hydrogen. The value for n is an integer in the range of from 1 to 10. Specific examples of glycol ethers which can suitably be used as the carrier fluid include, but are not limited to, ethylene glycol butyl ether, diethylene glycol dimethyl ether, diethylene glycol ethyl ether, diethylene glycol butyl ether, diethylene glycol phenyl ether, triethylene glycol butyl ether, dipropylene glycol methyl ether and dipropylene glycol dimethyl ether. Preferably, the glycol ethers of the invention are monoalkyl glycol ethers. The preferred glycol ethers for use as the carrier fluids of the suspension compositions are dipropylene glycol methyl ether and diethylene glycol butyl ether.

The glycol esters that can be used as the carrier fluid have the following general formula:

$$R_1\text{—}COO\text{—}[R_2\text{—}O]_n\text{—}R_3,$$

where $R_1$ is an alkyl group having from 1 to 6 carbon atoms, preferably from 1 to 4 carbon atoms, and where $R_2$ is an alkyl group having from 1 to 6 carbon atoms, preferably from 1 to 4 carbon atoms, and where $R_3$ is either a hydrogen, alkyl or $OOCR_4$, where $R_4$ has the same meaning of $R_1$. The value for n is an integer in the range of from 1 to 10. Specific examples of glycol ester compounds that can suitably be used as the carrier fluid include, but are not limited to, 1,2-ethanediol monoacetate and ethylene glycol diacetate.

Other examples of glycol ester compounds that can suitably be used as the carrier fluid include, but are not limited to, 2-ethoxy ethyl acetate, diethylene glycol ethyl ether acetate, diethylene glycol butyl ether acetate and dipropylene glycol methyl ether acetate.

Suitable lactate esters that can be used as the carrier fluid include, but are not limited to, ethyl lactate, methyl lactate, butyl lactate and combinations of any thereof.

According to the invention, the most preferred carrier fluids are ethylene glycol butyl ether, diethylene glycol butyl ether, triethylene glycol butyl ether and dipropylene glycol methyl ether.

Stable liquid non-aqueous suspensions according to the invention are those in which the water-soluble polymer remains dispersed in the liquid phase and does not settle out from the liquid phase after storage for 1 month at 50° C. or those suspensions which settle out, but show a separation of liquid phase on the top of the suspension which is less than 5% by volume after storage for 1 month at 50° C.

According to the invention, the water-soluble polymer is in the form of solid particulates that are substantially insoluble, or partially soluble, in the non-aqueous carrier fluid. The average diameter of the polymer particles is in the range from about 0.1 to about 1000 microns, preferably from about 0.5 to about 500 microns, more preferably from about 1 to about 100 microns.

According to the invention, suitable water-soluble polymers include various known polysaccharides or derivatives thereof that are commonly used in oilfield or mining fluids.

"Polysaccharide" as used herein means a polymer comprising a plurality of monosaccharides (sugar units), typically pentose and/or hexose sugar units. Non-limiting examples of suitable polysaccharides include starches, celluloses, hemicelluloses, xylans, gums, chitin, polygalactomannans, polyarabinans, polygalactans and mixtures thereof. The term "polysaccharide" is also meant to include polymers with heteroatoms present in the polysaccharide structure, such as chitin and/or chitosan, or polymers that comprise different types of sugar units (heteropolysaccharide), for example polymers that comprise pentose sugar units and hexose sugar units.

"Polysaccharide derivatives" refers to polysaccharides modified by chemical reactions resulting in chemical groups covalently bonded to the polysaccharide, e.g., methyl cellulose, ethyl cellulose, carboxymethyl cellulose, hydroxyethyl cellulose, hydroxypropyl guar, carboxymethyl guar, and the like.

These polysaccharides and derivatives thereof are known in the art and either are commercially available or can be manufactured using methods well known per se in the art.

Suitable, non limitative examples of polysaccharides include polygalactomannans, xanthan, chitosan, xyloglucans, pectin, alginate, agar, dextrin, starch, amylose, amylopectin, alternan, gellan, mutan, dextran, pullulan, fructan, gum arabic and carrageenan.

Examples of suitable polygalactomannans are guar gum, locust bean gum, tara gum, cassia gum and sesbania gum. A suitable example of xyloglucan is tamarind gum.

Suitable examples of polysaccharide derivatives include carboxymethyl-, hydroxypropyl-, hydroxyethyl-, ethyl-, methyl-ether polysaccharide derivatives, hydrophobically modified polysaccharide derivatives, cationic polysaccharide derivatives and mixed polysaccharide derivatives.

Among the polysaccharide derivatives, examples of cellulose derivatives are hydroxyethyl cellulose, ethyl hydroxyethyl cellulose, carboxymethyl cellulose, carboxymethyl hydroxyethyl cellulose, methyl cellulose, ethylcellulose, methyl hydroxypropyl cellulose, carboxymethylmethyl cellulose, hydrophobically modified carboxymethylcellulose, hydrophobically modified hydroxyethyl cellulose, hydrophobically modified hydroxypropyl cellulose, hydrophobically modified methyl cellulose.

Examples of guar derivatives include carboxymethyl guar, hydroxyethyl guar, hydroxypropyl guar, carboxymethyl hydroxypropyl guar, hydrophobically modified hydroxypropyl guar, hydrophobically modified carboxymethyl guar, cationic hydroxypropyl guar and hydrophobically modified cationic guar.

Examples of starch derivatives include carboxymethyl starch and hydroxypropyl starch.

Other polysaccharides may be similarly derivatized.

The polysaccharides or derivatives thereof of the invention can be crosslinked, by using, for example Borax (sodium tetraborate) or glyoxal.

According to an embodiment of the invention, the derivatized polysaccharides have a degree of substitution (DS) in the range of 0.01-3.0 or a molar substitution (MS) comprised between 0.01 and 4.0.

The expression "degree of substitution" (DS) refers to the average number of sites that are substituted with a functional group (e.g., carboxymethyl) per anhydroglycosidic unit in the polysaccharide. Usually each of the anhydroglycosidic units of a polysaccharide contains on the average three available hydroxyl sites. A degree of substitution of three would mean that all of the available hydroxyl sites have been substituted with functional groups.

With the expression "molar substitution" (MS), we mean the number of substituents (e.g., hydroxypropyl) on each anhydroglycosidic unit of the polysaccharide.

Preferably, the water-soluble polymer of the invention is a polysaccharide or derivative thereof selected among xanthan gum, cellulose ethers, guar gum and derivatives thereof or starch and derivatives thereof.

More preferably, the water-soluble polymer of the invention is xanthan gum or guar gum.

The suspending agent according to the invention is used not only to provide additional viscosity to the carrier fluid but also to assist in keeping the non-soluble particulate material dispersed in the carrier fluid. The suspending agent according to the invention must be soluble in the carrier fluid of the inventive composition and at the same time be able to enhance the suspendability of the water-soluble polymer within the liquid phase of the composition and, thus, the stability of the inventive composition. It has been found that stable non-aqueous suspension compositions can be obtained by using as suspending agent a copolymer of a monoethylenically unsaturated monomer containing a carboxylic group and a (meth)acrylic acid ester.

Preferably, said copolymer is obtained by polymerization of:
a) from 20 to 70% by weight, preferably from 20 to 50% by weight of a monoethylenically unsaturated monomer containing a carboxylic group;
b) from 20 to 70% by weight, preferably from 40 to 70% by weight, of a (meth)acrylic acid ester;
c) from 0 to 3% by weight, preferably from 0.01 to 1% by weight, of a polyethylenically unsaturated monomer;
d) from 0 to 10% by weight, preferably from 0 to 3% by weight of a nonionic acrylic associative monomer,
wherein the sum of a) and b) represents at least the 80% by weight of the monomer mixture.

Said copolymer can be prepared according to known polymerization methods such as emulsion, solution, bulk or precipitation polymerization, but preferably it is prepared by emulsion polymerization.

The monoethylenically unsaturated monomer a) containing a carboxylic group useful for the preparation of the copolymer of the present disclosure can be selected among ethylenically unsaturated mono- or di-carboxylic acids or salts thereof or anhydrides thereof, such as acrylic acid, methacrylic acid, itaconic acid, crotonic acid, maleic acid and fumaric acid. Methacrylic acid is the preferred monoethylenically unsaturated monomer a) containing a carboxylic group.

The (meth)acrylic acid ester b) is selected among $C_1$-$C_8$ (meth)acrylic acid alkyl esters, such as methyl, ethyl, propyl, butyl, 2-ethylhexyl(meth)acrylates or mixtures thereof. Preferably the (meth)acrylic acid ester b) is ethyl acrylate.

The polyethylenically unsaturated monomer c) can be any of the known polyfunctional derivatives that are known to undergo radical polymerization with (meth)acrylic monomers. Among the useful polyethylenically unsaturated monomers there are trimethylolpropane acrylate, diallyl maleate, allyl methacrylate, diallyl phthalate, N-methylene-bis-acrylamide, pentaerythritol ether polyacrylates and triallyl cianurate.

The nonionic acrylic associative monomer d) may be selected among (meth)acrylic acid esters of $C_8$-$C_{30}$ alkyl, alkylaryl or polycyclic hydrocarbyl monoether of a polyethylene glycol having at least two oxyethylene units, preferably having 10 to 40 oxyethylene units, and having up to 70 oxyethylene units, these esters having general formula

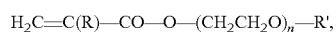

$$H_2C=C(R)-CO-O-(CH_2CH_2O)_n-R',$$

wherein
R is H or $CH_3$, the latter being preferred;
n is at least 2, and preferably has an average value of at least 10, up to 40 to 60 or even up to 70;
and R' is a hydrophobic group, for example an alkyl, alkylaryl, or polycyclic alkyl group having 8 to 30 carbon atoms, preferably having an average of 12 to 18 carbon atoms.

Other unsaturated monomers may be used in the polymerization beside the monomers a) to d), such as, by way of example, other nonionic acrylic monomers, monoethylenically unsaturated monomers possibly containing a sulfonic acid group, cationic acrylic monomers. Non limiting examples of other utilizable unsaturated monomers are vinyl acetate, styrene, vinyl chloride, vinylidene chloride, acrylonitrile, (meth)acrylamide, N,N-dimethyl(meth)acrylamide, t-butyl(meth)acrylamide, sodium vinyl sulfonate, 2-acrylamido-2-methylpropane sulfonic acid.

The copolymer of the invention has a Brookfield® viscosity in water at pH 7.5 (spindle 6, RVT, 20 rpm, 1.0% by weight and 20° C.) comprised between about 500 and about 10,000 mPa*s.

The copolymer of the invention shows its optimal suspending effect if it is completely undissociated (i.e., when the carboxyl groups are protonated). For this reason, if the water-soluble polymer to be suspended has a residual basicity, it can be necessary to add an acid before adding the water-soluble polymer to the composition.

Optionally, the suspensions of the invention can contain from 0 to 2.0 wt % of additional suspending agents selected from silica, fumed silica, colloidal or colloid-forming clays such as smecticte clays or attapulgite clays.

Suitable smectite clays (also known as montmorillonoid clays) include, for example, montmorillonite (bentonite), volchonskoite, nontronite, beidellite, hectorite, saponite, sauconite and vermiculite.

Attapulgite clays (also known as palygorskite clays) are magnesium-rich clays and suitable examples thereof are those commercially available from BASF under the tradename Attagel®.

The non-aqueous liquid suspension according to the invention can be prepared by any suitable method known in the art. The components of the inventive composition may be mixed together in any order or altogether at the same time; however, the suspending agent is preferably first dissolved or mixed with the carrier fluid prior to the addition of the non-soluble particles of water-soluble polymer to the thus-formed liquid mixture.

Conditions for mixing or dissolving the suspending agent in the non-aqueous liquid medium are not a critical aspect of the invention and the skilled in the art may use conventional techniques for forming the solution. Generally, the temperature range for mixing the suspending agent in the non-aqueous liquid medium shall be in the range of from about 5° C. to about 150° C., but the preferred temperature range is from about 10° C. to about 100° C. and the most preferred temperature range is from about 20° C. to about 60° C. Any standard mixing device that provides reasonably high shear to assist in forming the solution of non-aqueous liquid medium and suspending agent can be used. The mixing time is that which is necessary to provide the desirable solution such that the suspending agent is dissolved in the non-aqueous liquid medium. Such mixing time is generally in the range of from about 0.01 hours to about 200 hours.

The non-aqueous liquid suspensions according to the invention are suitable for use as an additive to water-based fluids which are used in many treatments of subterranean formations. Such treatments include (but are not limited to) drilling, completion, stimulation (acidizing or acid fracturing or hydraulic fracturing), remediation, workover, cleanout or scale removal.

Said treatments may also be employed in wells drilled for purposes other than the production of oil and gas, for example for tunnelling and civil engineering drilling applications.

According to the invention, the non-aqueous liquid suspensions are particularly suitable as rheology modifiers for cuttings re-injection operations (which represent an environmentally friendly and economically attractive solution for disposal of cuttings from a drilling operations), wherein cuttings are ground into smaller particles in the presence of water to form a water-based slurry.

To demonstrate the advantages of the non-aqueous suspension of the present invention, suspensions were prepared with exemplary suspending agents, evaluating the rheological behavior of the suspending agent and the stability of the suspensions thus obtained.

EXAMPLES

Method for Preparation of the Suspension

Carrier fluid is weighted in a 250 mL glass beaker; the emulsion polymer is weighted in a plastic syringe and is added slowly dropwise under magnetic stirring to the carrier fluid. After 10 minutes of stirring the fluid is ready for viscosity measurement. In case the polysaccharide particles to be suspended have a residual basicity, acetic acid is added to the viscosified carrier fluid. Then the polysaccharide particles to be suspended are weighted and added slowly under mechanical stirring to the viscosified carrier fluid; the mixture is stirred for 5 minutes to achieve an homogeneous suspension.

Viscosity Measurements

RV Brookfield® Viscosity (20 rpm, 25° C.) is measured following ASTM D 2196 with spindle 3 on the thickened carrier fluid and with spindle 5 on the suspension.

Stability Test 200 mL of suspension are poured in a glass jar and closed with a cap in order to avoid evaporation of the fluid. The jar is stored in a oven at 50° C. for at least 1 month. Stability is evaluated as percent separation of the carrier fluid on the top of the suspension with the following formula:

% separation=(height of separated carrier fluid on top/total height of the suspension)·100

A suspension is considered stable if the percent separation after 1 month at 50° C. is equal to or less than 5%.

Examples 1-17

Suspensions compositions (wt %) and tests results are reported in Tables 1a-1b.

In the comparative Examples 12 and 13, it was not possible to perform the viscosity measurements on the suspension and stability tests due to the formation of a paste instead of a stable suspension.

The results of the stability test show that the emulsion polymer according to the invention is particularly suitable to provide stable suspensions, whereas the polyacrylic acids and the polyvinylpirrolidone tested in the comparative Examples fail to provide stable suspensions.

TABLE 1a

| EXAMPLES | 1 | 2 | 3 | 4 | 5 | 6 | 7 | 8 |
|---|---|---|---|---|---|---|---|---|
| Carrier Fluid | | | | | | | | |
| ethylene glycol butyl ether | 50.4 | | | | 57.0 | 57.0 | | |
| diethylene glycol butyl ether | | 51.0 | | | | | | |
| triethylene glycol butyl ether | | | 52.0 | | | | | |
| dipropylene glycol methyl ether | | | | 51.0 | | | | |
| diethylene glycol phenyl ether | | | | | | | 51.5 | |
| butyl lactate | | | | | | | | 49.0 |
| water | | | | | | | | |
| Suspending agent | | | | | | | | |
| emulsion polymer according to the invention (active matter 37 wt %) | 7.6 | 7.0 | 6.0 | 7.0 | 8.0 | 8.0 | 6.5 | 9.0 |
| dry polymer according to the invention (active matter 100 wt %) | | | | | | | | |
| TC-Carbomer 340[1, 2] | | | | | | | | |
| TC-Carbomer 380[1, 2] | | | | | | | | |
| PVP K90[1, 3] | | | | | | | | |
| Water-soluble polymer | | | | | | | | |
| xanthan gum | 42.0 | 42.0 | 42.0 | 42.0 | | | 42.0 | 42.0 |
| guar gum | | | | | 35.0 | | | |
| hydroxyethyl cellulose (HEC) | | | | | | 35.0 | | |
| hydroxypropyl guar (HPG) (MS 0.4, crosslinked with Borax) | | | | | | | | |
| Neutralizing agent | | | | | | | | |
| acetic acid (80%) | | | | | | | | |
| Viscosity (mPa*s) | | | | | | | | |
| thickened carrier fluid | 1100 | 1700 | 1335 | 1915 | 460 | 460 | 2250 | 1610 |
| suspension | 6500 | 8580 | 8240 | 9820 | 5060 | 3640 | 2820 | 1426 |
| Stability test | | | | | | | | |
| After 1 month at 50° C. (% of separation) | 1 | 1 | 1 | 4 | 4 | 4 | 0 | 5 |

[1] comparative
[2] crosslinked polyacrylic acid, commercially available from Guangzhou Tinci Materials Technology Co., Ltd.
[3] polyvinylpyrrolidone, commercially available from Ashland TABLE 1b

| EXAMPLES | 9 | 10 | 11 | 12 | 13 | 14 | 15 | 16 | 17 |
|---|---|---|---|---|---|---|---|---|---|
| Carrier Fluid | | | | | | | | | |
| ethylene glycol butyl ether | 57.0 | 57.0 | 52.0 | 52.2 | 52.2 | 47.0 | | | 54.5 |
| diethylene glycol butyl ether | | | | | | | 55.5 | 59.3 | |
| triethylene glycol butyl ether | | | | | | | | | |
| dipropylene glycol methyl ether | | | | | | | | | |
| diethylene glycol phenyl ether | | | | | | | | | |
| butyl lactate | | | | | | | | | |
| water | | | | 5.0 | 5.0 | 5.0 | | | |
| Suspending agent | | | | | | | | | |
| emulsion polymer according to the invention (active matter 37 wt %) | | | | | | | | | 7.5 |
| dry polymer according to the invention (active matter 100 wt %) | | | | | | | 2.5 | 2.7 | |
| TC-Carbomer 340[1, 2] | 1.0 | | | 0.8 | | | | | |
| TC-Carbomer 380[1, 2] | | 1.0 | | | 0.8 | | | | |
| PVP K90[1, 3] | | | 6.0 | | | 6.0 | | | |
| Water-soluble polymer | | | | | | | | | |
| xanthan gum | 42.0 | 42.0 | 42.0 | 42.0 | 42.0 | 42.0 | 42.0 | | |
| guar gum | | | | | | | | | |
| hydroxyethyl cellulose (HEC)[4] | | | | | | | | | |

TABLE 1b-continued

| EXAMPLES | 9 | 10 | 11 | 12 | 13 | 14 | 15 | 16 | 17 |
|---|---|---|---|---|---|---|---|---|---|
| Hydroxypropyl guar (HPG) (MS 0.4, crosslinked with Borax) | | | | | | | | 37.0 | 37.0 |
| Neutralizing agent | | | | | | | | | |
| acetic acid (80%) | | | | | | | | 1.0 | 1.0 |
| Viscosity (mPa*s) | | | | | | | | | |
| thickened carrier fluid | 1325 | 1155 | 2350 | 1200 | 860 | 1390 | 1755 | 1950 | 1390 |
| suspension | 9820 | 9500 | 7900 | — | — | 1008 | 6720 | 1250 | 1050 |
| Stability test | | | | | | | | | |
| After 1 month at 50° C. (% of separation) | 20 | 15 | 20 | — | — | 20 | 0 | 5 | 5 |

[1] comparative
[2] crosslinked polyacrylic acid, commercially available from Guangzhou Tinci Materials Technology Co., Ltd.
[3] polyvinylpyrrolidone, commercially available from Ashland
[4] Natrosol 250 HR, commercially available from Ashland

The invention claimed is:

1. A non-aqueous suspension composition comprising:
    a) from 20 to 80 wt % of a carrier fluid having a molecular weight from 100 to 4000 Da and selected from the group consisting of glycols, polyglycols, glycol ethers, glycol esters, lactate esters, and mixtures thereof;
    b) from 5 to 60 wt % of a water-soluble polymer dispersed in said carrier fluid, wherein the water-soluble polymer is a polysaccharide or a polysaccharide derivative;
    c) from 0.5 to 15 wt % of a suspending agent, wherein said suspending agent is a copolymer of a monoethylenically unsaturated monomer containing a carboxylic group and a (meth)acrylic acid ester, and wherein the suspending agent has a viscosity at 1% by weight in water, 20° C., and pH 7.5 in the range of about 500 to about 10,000 mPa*s; and,
    wherein the suspending agent copolymer is obtained by polymerization of:
        w) from 20 to 50% by weight of a monoethylenically unsaturated monomer containing a carboxylic group;
        x) from 40 to 70% by weight of a (meth)acrylic acid ester;
        y) from 0.01 to 1% by weight of a polyethylenically unsaturated monomer;
        z) from 0 to 3% by weight of a nonionic acrylic associative monomer,
        wherein the sum of w) and x) represents at least the 80% by weight of the monomer mixture.

2. The non-aqueous suspension composition according to claim 1, wherein the water-soluble polymer is a polysaccharide or derivative thereof selected among xanthan gum, cellulose ethers, guar gum and derivatives thereof or starch and derivatives thereof.

3. The non-aqueous suspension composition according to claim 1, wherein the water-soluble polymer is xanthan gum or guar gum.

4. The non-aqueous suspension composition according to claim 1, wherein the carrier fluid is a glycol ether.

5. The non-aqueous suspension composition according to claim 1, wherein the carrier fluid is ethylene glycol butyl ether, diethylene glycol butyl ether, triethylene glycol butyl ether or dipropylene glycol methyl ether.

6. The non-aqueous suspension composition according to claim 1, wherein it comprises:
    a) from 30 to 60 wt % of carrier fluid;
    b) from 30 to 50 wt % of water-soluble polymer;
    c) from 1 to 10 wt % of suspending agent.

7. The non-aqueous suspension composition according to claim 1, wherein it further contains from 0 to 2.0 wt % of additional suspending agents selected among silica, fumed silica, smecticte clays or attapulgite clays.

8. The non-aqueous suspension composition according to claim 1, wherein the suspending agent copolymer is an emulsion copolymer.

9. A method for treating a subterranean formation comprising the following steps:
    i. providing an aqueous fluid containing a suspension composition comprising:
        a) from 20 to 80 wt % of a carrier fluid having a molecular weight from 100 to 4000 Da and selected from the group consisting of glycols, polyglycols, glycol ethers, glycol esters, lactate esters and mixtures thereof;
        b) from 5 to 60 wt % of a water-soluble polymer dispersed in said carrier fluid, wherein said water-soluble polymer is, wherein the water-soluble polymer is a polysaccharide or a polysaccharide derivative;
        c) from 0.5 to 15 wt % of a suspending agent, wherein said suspending agent is a copolymer of a monoethylenically unsaturated monomer containing a carboxylic group and a (meth)acrylic acid ester, and wherein the suspending agent has a viscosity at 1% by weight in water, 20° C., and pH 7.5 in the range of about 500 to about 10,000 mPa*s; and,
        wherein the suspending agent copolymer is obtained by polymerization of:
            w) from 20 to 50% by weight of a monoethylenically unsaturated monomer containing a carboxylic group;
            x) from 40 to 70% by weight of a (meth)acrylic acid ester;
            y) from 0.01 to 1% by weight of a polyethylenically unsaturated monomer;
            z) from 0 to 3% by weight of a nonionic acrylic associative monomer,
            wherein the sum of w) and x) represents at least the 80% by weight of the monomer mixture
    ii. placing the aqueous fluid into a subterranean formation.

10. The method for treating a subterranean formation according to claim 9, wherein the suspending agent copolymer is an emulsion copolymer.

11. A non-aqueous suspension composition comprising:
a) from 20 to 80 wt % of a carrier fluid having a molecular weight from 100 to 4000 Da and selected from the group consisting of glycols, polyglycols, glycol ethers, glycol esters, lactate esters, and mixtures thereof;
b) from 5 to 60 wt % of a water-soluble polymer dispersed in said carrier fluid, wherein the water-soluble polymer is a polysaccharide or a polysaccharide derivative;
c) from 0.5 to 15 wt % of a suspending agent, wherein said suspending agent is a copolymer of a monoethylenically unsaturated monomer containing a carboxylic group and a (meth)acrylic acid ester, and wherein the suspending agent copolymer is an emulsion copolymer; and,
wherein the suspending agent copolymer is obtained by polymerization of:
　w) from 20 to 50% by weight of a monoethylenically unsaturated monomer containing a carboxylic group;
　x) from 40 to 70% by weight of a (meth)acrylic acid ester;
　y) from 0.01 to 1% by weight of a polyethylenically unsaturated monomer;
　z) from 0 to 3% by weight of a nonionic acrylic associative monomer,
wherein the sum of w) and x) represents at least the 80% by weight of the monomer mixture.

\* \* \* \* \*